(12) United States Patent
Hug

(10) Patent No.: US 7,949,877 B2
(45) Date of Patent: May 24, 2011

(54) RIGHTS ENFORCEMENT AND USAGE REPORTING ON A CLIENT DEVICE

(75) Inventor: Joshua D. Hug, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 1506 days.

(21) Appl. No.: 10/719,674

(22) Filed: Nov. 21, 2003

(65) Prior Publication Data

US 2005/0022025 A1    Jan. 27, 2005

Related U.S. Application Data

(60) Provisional application No. 60/484,018, filed on Jun. 30, 2003.

(51) Int. Cl.
*H04L 9/32* (2006.01)
(52) U.S. Cl. .......................... 713/176; 713/170
(58) Field of Classification Search ................. 713/170, 713/176, 194; 380/282
See application file for complete search history.

(56) References Cited

U.S. PATENT DOCUMENTS

| | | |
|---|---|---|
| 5,638,443 A | 6/1997 | Stefik et al. |
| 5,943,422 A | 8/1999 | Van Wie et al. |
| 6,079,018 A * | 6/2000 | Hardy et al. .................. 713/170 |
| 6,112,181 A | 8/2000 | Shear et al. |
| 6,449,367 B2 | 9/2002 | Van Wie et al. |
| 6,618,484 B1 | 9/2003 | Weber et al. |
| 6,658,568 B1 | 12/2003 | Ginter et al. |
| 6,754,642 B2 | 6/2004 | Tadayon et al. |
| 6,789,188 B1 | 9/2004 | Epstein et al. |
| 6,959,384 B1 * | 10/2005 | Serret-Avila .................. 713/176 |
| 7,062,500 B1 * | 6/2006 | Hall et al. ..................... 707/102 |
| 7,080,043 B2 * | 7/2006 | Chase et al. .................... 705/59 |
| 2002/0152393 A1 * | 10/2002 | Thoma et al. ................. 713/189 |
| 2003/0046238 A1 * | 3/2003 | Nonaka et al. ................ 705/51 |

* cited by examiner

*Primary Examiner* — Nasser Moazzami
*Assistant Examiner* — Carlton V Johnson
(74) *Attorney, Agent, or Firm* — AEON Law; Adam L. K. Philipp; Kyle H. Flindt

(57) ABSTRACT

An integrity hash is obtained of rights information stored at a client device. The rights information is associated with content stored at the client device. The integrity hash is encrypted using a client device key to generate an encrypted hash. The client device key is externally inaccessible from the client device. The encrypted hash is stored on the client device.

38 Claims, 6 Drawing Sheets

RIGHTS ENFORCEMENT AND USAGE REPORTING ON A CLIENT DEVICE

RELATED APPLICATIONS

This application claims priority to U.S. provisional application No. 60/484,018, filed on Jun. 30, 2003.

FIELD OF THE INVENTION

The present invention relates to the field of electronic content management. More specifically, the present invention relates to rights enforcement and usage reporting for content on a client device.

BACKGROUND

Electronic content can include a wide variety of audio and/or video presentations, such as music, dialogue, still pictures, movies, and the like. A client device can include a wide variety of electronic devices, such as an MP3 player, a personal data assistant (PDA), a cellular phone, and the like. Rights enforcement involves defining how content can be used on a client device. For instance, rights information associated with a piece of content may permit rendering the content, but not copying or distributing the content.

Rights information is often closely tied to usage information. For instance, rights information may define that a piece of content can be played a particular number of times or for a certain duration. In which case, the content's usage may be tracked so that the rights limitation can be enforced. Similarly, a variety of business models can be designed around usage. For instance, with a pay-per-play business model, a user or distributor may pay royalties or license fees based on the number or duration of plays. In which case, the usage information may need to be reported from the client device to a server device.

In order to enforce content rights, the rights and/or usage information needs to be protected in some way. If the information is not protected, a user could, for instance, modify the information to improperly grant himself or herself additional rights or reset the number of plays. Protecting rights information usually involves encrypting the rights information. As long as the rights information is encrypted, the information is unreadable. Encryption, however, relies on secret keys, making encryption only as secure the security measures surrounding the code.

Security of usage reporting is often handled in one of two ways. In one approach, the client device can perform the encryption and decryption itself. In which case, the client device usually needs an application program interface (API) to manage communications with an external device. For example, if a client device stores the rights and/or usage information in encrypted form, a server device may need to establish communications with the client device through an API. The API may be able to receive and process a variety of requests from the server device. In response to a request to report how many times a particular piece of content has been played, the client device may decrypt the usage information and deliver it to the server through the API in a format that the server device can understandable.

Many client devices, however, are intended to be quite simple and inexpensive, lacking the resources to provide an API that can manage content and external communications, which leads to the second commonly used security approach. These simple client devices often rely on an external device, such as a server, to provide security of usage reporting. Unfortunately, externally managed security is ripe for abuse. That is, when the secret, or cryptographic key, is known outside the client device, a persistent user is likely to be able to find it.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention can store rights and/or usage information in clear form on a client device while still providing security for the content and integrity for the rights/usage information. Storing the information in clear form can greatly simplify rights enforcement and/or usage reporting because the information does not need to be decrypted before it can be read or used either on the client device or by an external device. Security and integrity can be provided on the client device by using a device key that is externally inaccessible from the client device, reducing or eliminating the need to depend on externally known secrets. For example, a client device, such as an MP3 player or PDA, often includes a hardware key embedded within the device. The hardware key can be used within the device by embodiments of the present invention, but, because the key is usually not accessible through any external data paths, the key can be externally inaccessible and quite secure.

Figure 1:
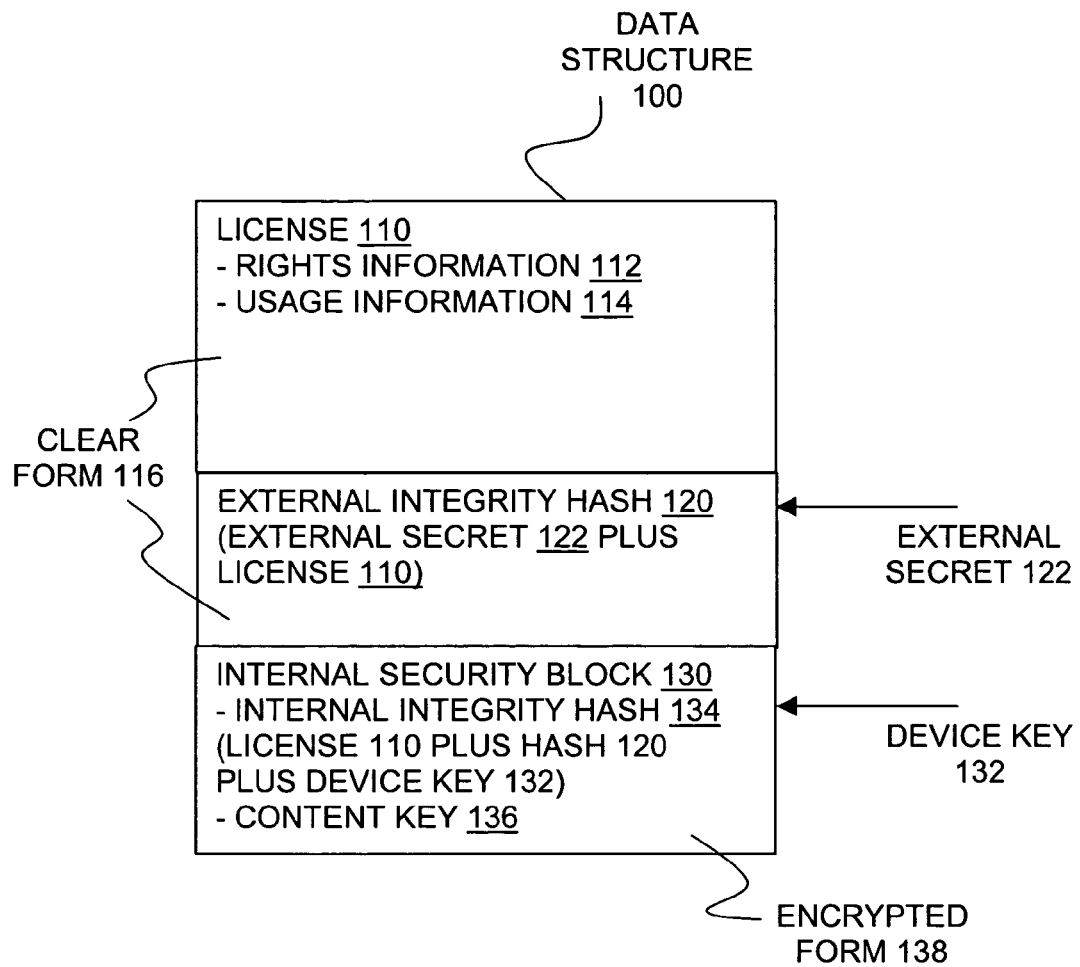
FIG. 1 illustrates one embodiment of a data structure.

FIG. 1 illustrates one embodiment of the present invention in the form of a data structure stored on a client device. Data structure 100 includes license 110, external integrity hash 120, and internal security block 130. License 110 can include rights information 112, usage information 114, and any other information associated with a piece of content (not shown) stored on the client device. License 110 can be stored in clear form 116. That is, license 110 need not be encrypted so it can be read using any device that can read the memory of the client device. In other words, usage reporting can be as simple as reading usage information 114 from the client's memory. For instance, each time a user downloads new content or renews a license, the server can read the usage information.

External security hash 120 can be a hash of license 110 in combination with external secret 122. A hash is a mathematical compression of a block of data. Virtually any change to the block of data will result in a different hash. So, by comparing two hashes of the block of data, it is possible to determine, to a probabilistic certainty, whether or not the data has been changed between hashes. In other words, a hash can be used to test the integrity of a block data and determine whether or not the data has been tampered with.

External secret 122 can be a number of bits or bytes of data that are appended, or otherwise combined, with license 110 prior to generating hash 120. Without knowing secret 122, it is virtually impossible to recreate license 110 or secret 122 from hash 120. In which case, hash 120 is often referred as a one-way hash. Any number of hash algorithms can be used to generate hash 120, including HMAC-SHA1 (Hash Message Authentication Code-Secure Hash Algorithm) or HMAC-MD5 (HMAC-Message Digest 5).

Like license 110, external integrity hash 120 can be stored in clear form 116 so that a device having access to secret 122 can use hash 120 to detect tampering with license 110. For example, since license 110 can be stored in clear form 116, a mildly sophisticated user may find a way to read and modify rights information 112 and/or usage information 114. However, without secret 122, the user will not be able to correctly regenerate hash 120. An external device that reads license 110, and knows secret 122, can compute the hash of the combination and compare it to hash 120 from data structure 100. If the hashes do not match, the tampering can be detected.

In order to use hash 120 to test the integrity of license 110, external secret 122 is known external to the client device. Any of a variety of approaches can be used to try to maintain the security of secret 122, but, unfortunately, any secret known outside the client device is likely to be vulnerable. A sophisticated and determined user is likely to gain access to secret 122 eventually. But, even if hash 120 is compromised, the illustrated embodiment includes a second layer of security and integrity that does not rely on an externally known secret, namely internal security block 130.

Internal security block 130 uses device key 132 to encrypt the contents of the block and store the block in encrypted form 138. Device key 132 is intended to be externally inaccessible from the client device. Any number of cryptographic techniques can be used for the encryption. In one embodiment, dedicated and trusted cryptographic hardware can be used, where the cryptographic hardware itself is also externally inaccessible.

In the illustrated embodiment, internal security block 130 includes both content key 136 and internal security hash 134. Internal security hash 134 can be a one-way hash of a combination of license 110, external integrity hash 120, and device key 132. As with external integrity hash 120, internal security hash 134 can be used to test the integrity of license 110. However, as long as key 132 is only known on the client device, hash 134 can only be calculated and used on the client device.

Content key 136 is a cryptographic key that can be used to decrypt the content. That is, the content associated with license 110 can be stored on the client device in encrypted form. The content cannot be used without first decrypting content key 136 from block 130. For example, before playing the content, the client device can check license 110 to make sure the rights allow the content to be play and/or make sure a usage limit has not been reached. If the rights are satisfied, the client can compute a hash and compare it to internal integrity hash 134 to test for tampering. Assuming no tampering, the client can decrypt content key 136, play the content using the decryption key, and update usage information 114. And, of course, after updating usage information 114, the client can recalculate, re-encrypt, and restore hash 134, and possibly recalculate and restore hash 120.

If, on the other hand, tampering is detected, the client can disable the content, either through some positive action, such as erasing the content, or through some passive action, such as not decrypting content key 136. The client device could also record the tampering event in, for instance, license 110 where it will be externally accessible.

So, even if a user manages to tamper with license 110, and manages to find external secret 122 to correspondingly update external integrity hash 120, internal integrity hash 134 will most likely render the content unusable on the client device. In other words, a user may be able to change usage reporting information 114 for external reporting, but, by doing so, the user will lose access to the associated content.

The embodiment of FIG. 1 includes a number of implementation-specific details. In alternate embodiments, the data structure could be arranged in any number of ways, divided among any number of memory devices, and the like. Alternate embodiments may not include all of the illustrated components, may include additional components, and may combine/separate one or more components. For instance, external integrity hash 120 may not be included at all, may be a hash of just rights information 112 or usage information 114, or may also be encrypted using the same or a different external secret. Similarly, internal integrity hash 134 may not be encrypted, and may be a hash of just one or more of rights information 112 and usage information 114. In yet another embodiment, external integrity hash 120 may be stored externally, for instance on a server device that also stores secret 122.

Figure 2:
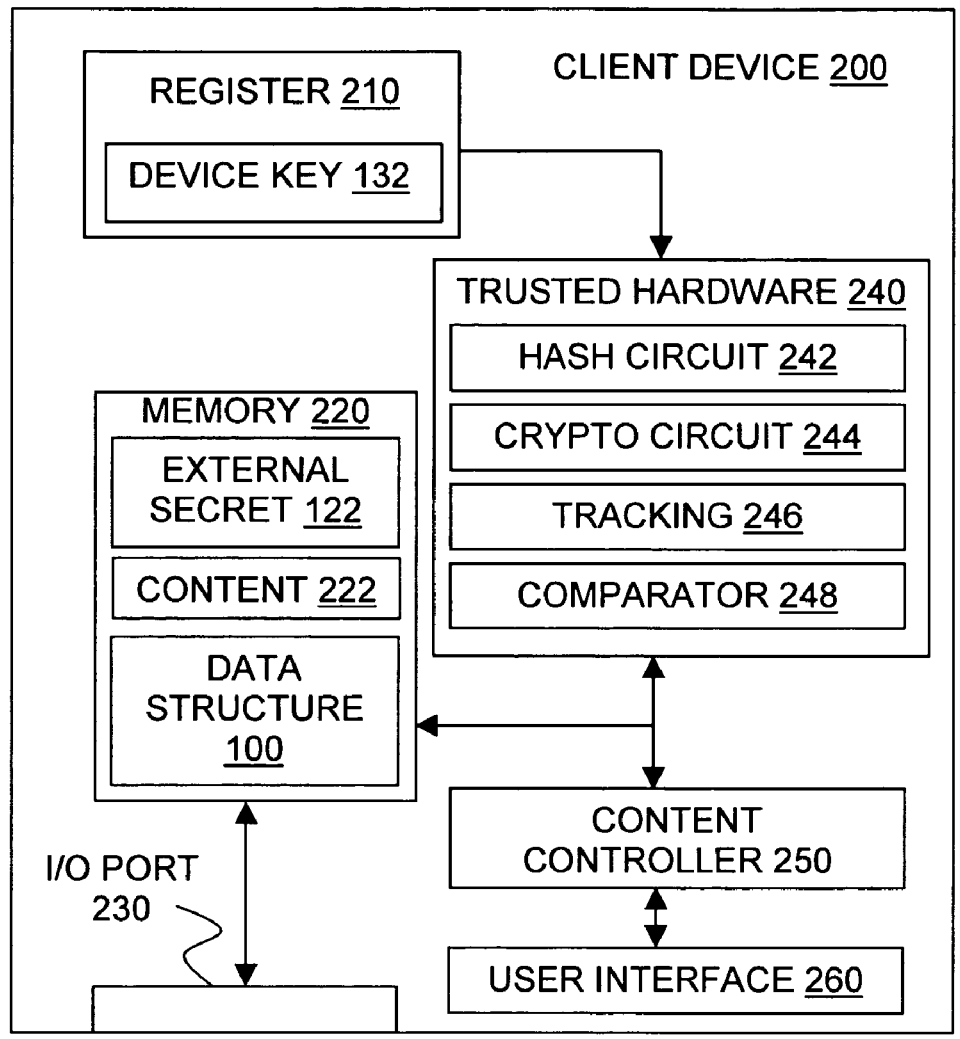
FIG. 2 illustrates one embodiment of a client device.

FIG. 2 illustrates one embodiment of a client device 200 that can use a data structure, such as data structure 100 from FIG. 1, to manage content. Client device 200 could be any of a number of devices, including an MP3 player, a personal data assistant, or a cellular phone. Client device 200 includes a register 210, a memory 220, an input/output (I/O) port 230, trusted hardware 240, and a user interface 260. Both register 210 and trusted hardware 240 are externally inaccessible from client device 200. That is, no external I/O path connects to either register 210 or hardware 240.

Register 210 stores device key 132 from FIG. 1. Memory 220 stores external secret 122 and data structure 100 from FIG. 1, as well as content 222. I/O port 230 makes memory 220 externally accessible. That is, any number of devices may be able to store and read information from memory 220. User interface 260 may include, for instance, a viewing screen, speaker(s), headphone port, buttons, switches, and the like.

Trusted hardware 240 includes hash circuit 242, crypto circuit 244, tracking circuit 246, and comparator 248. Trusted hardware 240 could be, for instance, an application specific integrated circuit (ASIC), a programmable gate array, a digital signal processor (DSP), a microprocessor, or any combination thereof that can provide the desired functionality.

Trusted hardware 240 has access to both register 210 and memory 220. Hash circuit 242 can be used to generate hashes 120 and/or 134 in data structure 100 using device key 132 from register 210 and/or external secret 122 from memory 220. Crypto circuit 244 can be used to generated the encrypted form 138 of internal security block 130 using device key 132. Tracking circuit 246 can be used to track usage of content 222 and update usage information 114. Comparator 248 can be used to compare newly generated hashes to hashes 120 and/or 134 to detect tampering.

Content controller 250 can control user access to content 222 through user interface 260 by, for instance, initiating hash circuit 242 when a play command is received and disabling the content if comparator 248 detects tampering.

The embodiment of FIG. 2 includes a number of implementation-specific details. Alternate embodiments may not include all of the illustrated components, may include additional components, and may combine/separate one or more components. For instance, other embodiments may store multiple pieces of content and associated rights data on the client device. And, rather than or in addition to an I/O port to download secret 122, content 222, and/or various parts of data structure 100, these data items could be installed using a removable storage medium, such a disk, cartridge, and/or memory stick. In these embodiments, memory 220 could be at least partially located on the removable storage medium.

Figure 3A:
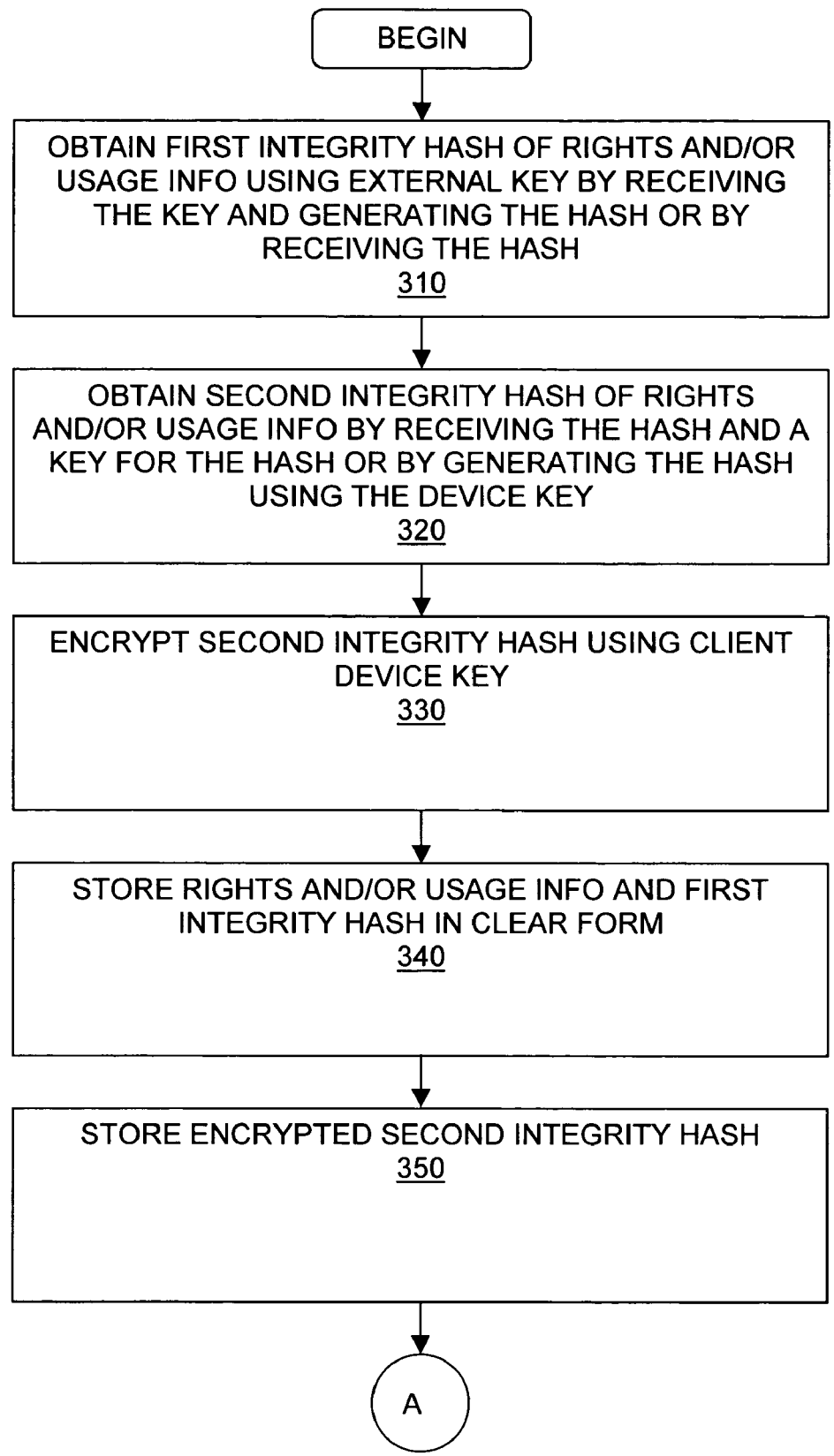
FIGS. 3A and 3B illustrate one embodiment of the present invention from the perspective of a client device.
Figure 3B:
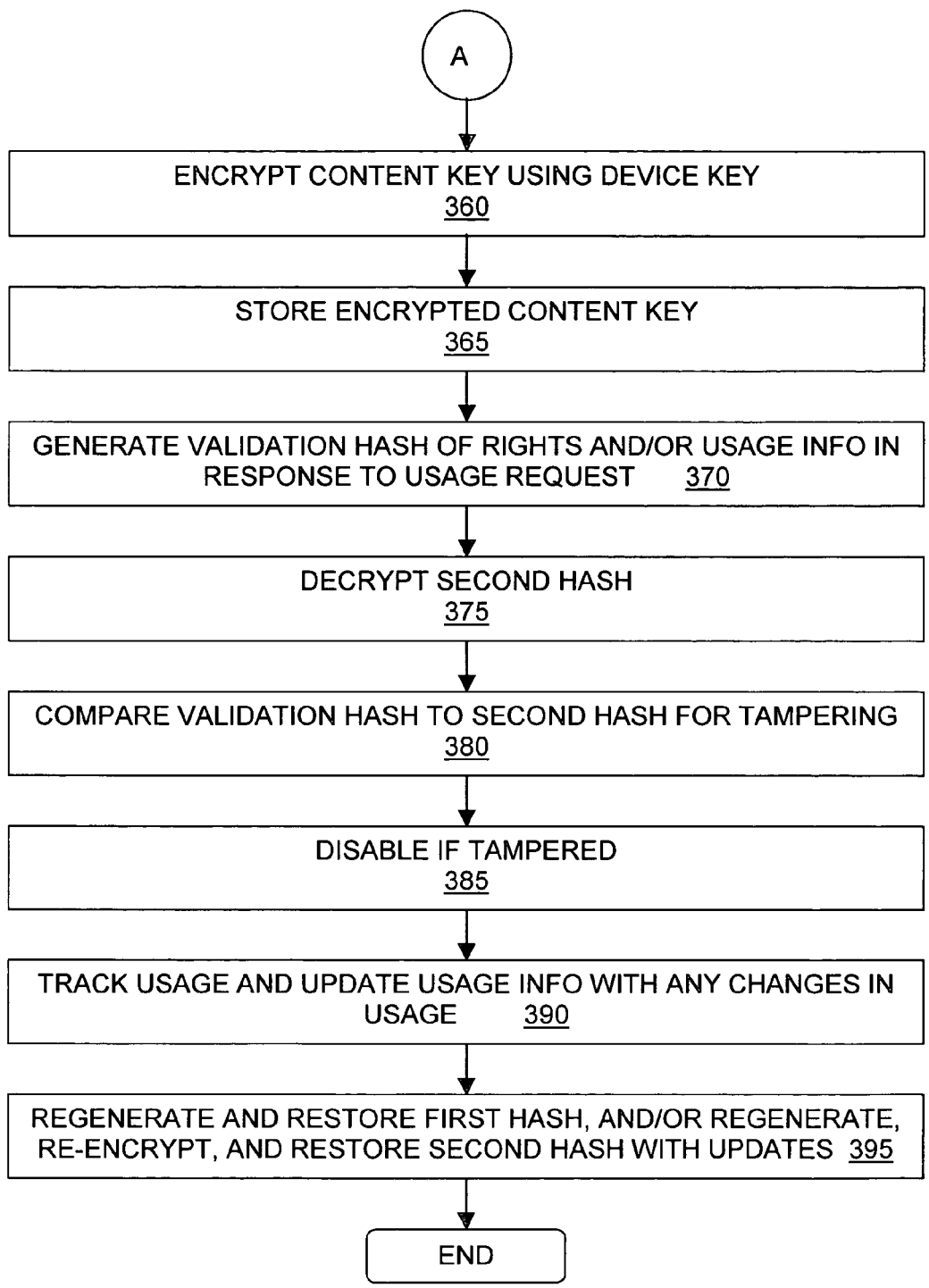

FIGS. 3A and 3B illustrate one embodiment of the present invention from the perspective of a client device. At 310, the client obtains a first integrity hash. This first hash could be a hash of rights and/or usage information in combination with an external secret, or key. The external key could be received from a server and then used on the client device itself to generate the hash. Alternatively, the hash could be generated on an external device using the key and then the hash could be downloaded or installed on the client device. In the later situation, the external key may also be downloaded to the client device so that the client device can regenerate the hash as usage information changes.

At 320, the client device obtains a second integrity hash. This second hash could also be a hash of rights and/or usage information in combination with a key. The key could be the same external key used for the first hash, or it could be a different external key, or it could be the internal device key. In the case of an external key, the client device could receive the key and generate the second hash itself, or the second hash could be generated externally and downloaded or installed on the client, possibly along with the external key. In the case of the internal device key, the client device can generate the second hash internally.

At 330, the client device encrypts the second integrity hash using the internal secret, the device key in this example. At 340, the client device stores the rights and/or usage information, and the first integrity hash, in a clear form. The client device stores the second integrity hash in an encrypted form at 350. In addition to storing the encrypted integrity hash, the client also encrypts a content key using the device key at 360 and stores the encrypted content key at 365.

In response to a usage request for the content associated with the content key, the client device generates a validation hash of the rights and/or usage information at 370. The validation hash is for comparison with the second hash, so the same set of data used to generate the second hash is used to generate the validation hash.

At 375, the client device uses the device key to decrypt the second hash, and, at 380, the client device compares the validation hash to the second hash. If the hashes match, no tampering is detected and the content may be accessed. At 385, however, if tampering is detected, the content is disabled. Disabling the content may include erasing the content from the client's memory, disabling decryption of the content, or the like.

At 390, the client device tracks usage and updates the usage information with any changes in usage. For example, the client device may record the number of times the content has been played, what sections of the content have been played, how long the content or section of the content have been played, and the like. Usage tracking may also include making a record of any tampering.

Assuming the usage information is updated, the client device may update one or both of the hashes as well at 395. That is, assuming the hashes include the usage information, the client device will likely need to replace the hashes after any update. The first hash can be regenerated and restored. The second hash can be regenerated, re-encrypted, and restored.

Figure 4:
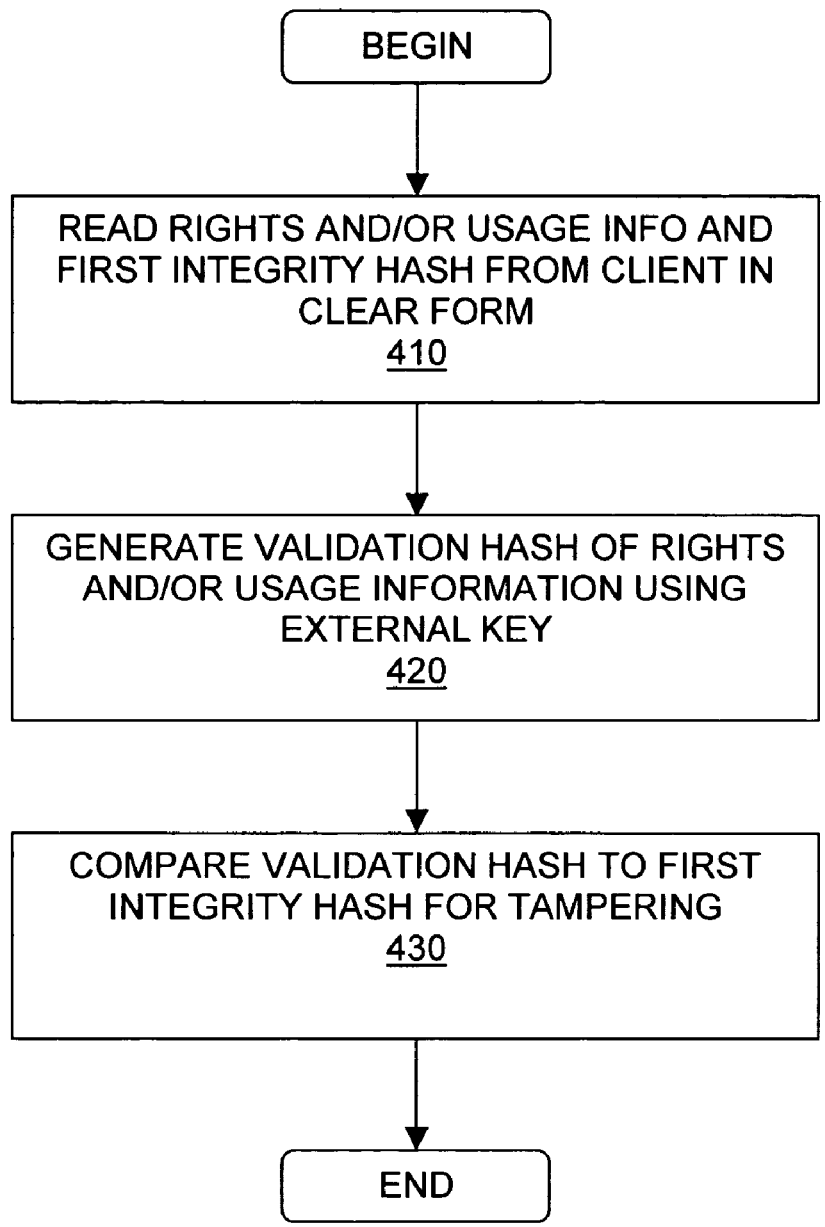
FIG. 4 illustrates one embodiment of the present invention from the perspective of a server device.

FIG. 4 illustrates one embodiment of the present invention from the perspective of a server device. At 410, the server device reads rights and/or usage information, as well as a first integrity hash, from a client device in clear form. At 420, the server generates a validation hash using the same set of data used to generate the first integrity hash. That is, if the first integrity hash included both the rights and usage information, then the validation hash does too. The server also uses the same external key to generate the validation hash. At 430, the server compares the validation hash to the first integrity hash to detect tampering with the rights and/or usage information.

FIGS. 3 and 4 includes a number of implementation-specific details. Alternate embodiments may not include all of the illustrated components, may include additional components, may combine/separate one or more components, and may arrange the components in a different order.

Figure 5:
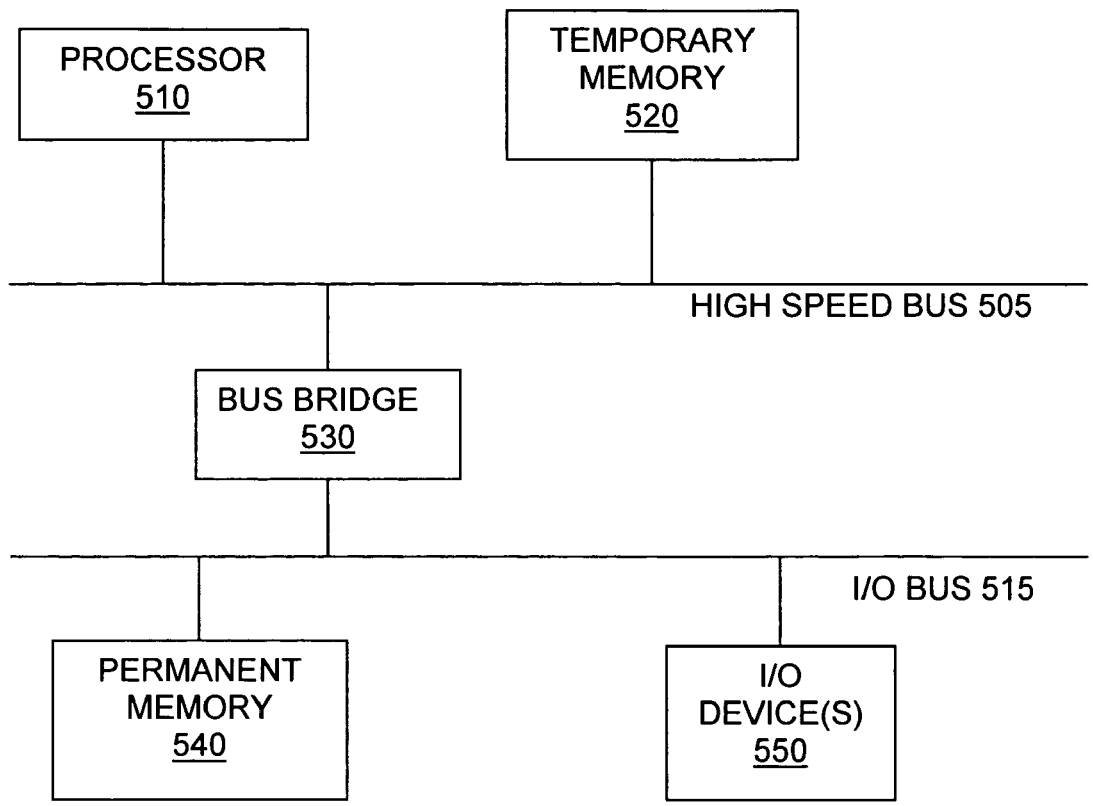
FIG. 5 illustrates one embodiment of a generic hardware system.

FIG. 5 illustrates one embodiment of a generic hardware system intended to represent a broad category of computer systems such as personal computers, workstations, and/or embedded systems. In the illustrated embodiment, the hardware system includes processor 510 coupled to high speed bus 505, which is coupled to input/output (I/O) bus 515 through bus bridge 530. Temporary memory 520 is coupled to bus 505. Permanent memory 540 is coupled to bus 515. I/O device(s) 550 is also coupled to bus 515. I/O device(s) 550 may include a display device, a keyboard, one or more external network interfaces, etc.

Certain embodiments may include additional components, may not require all of the above components, or may combine one or more components. For instance, temporary memory 520 may be on-chip with processor 510. Alternately, permanent memory 540 may be eliminated and temporary memory 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, could be implemented using one or more hardware systems such as the hardware system of FIG. 5. Where more than one computer is used, the systems can be coupled to communicate over an external network, such as a local area network (LAN), an internet protocol (IP) network, etc. In one embodiment, the present invention as described above may be implemented as software routines executed by one or more execution units within the computer(s). For a given computer, the software routines can be stored on a storage device, such as permanent memory 540.

Figure 6:
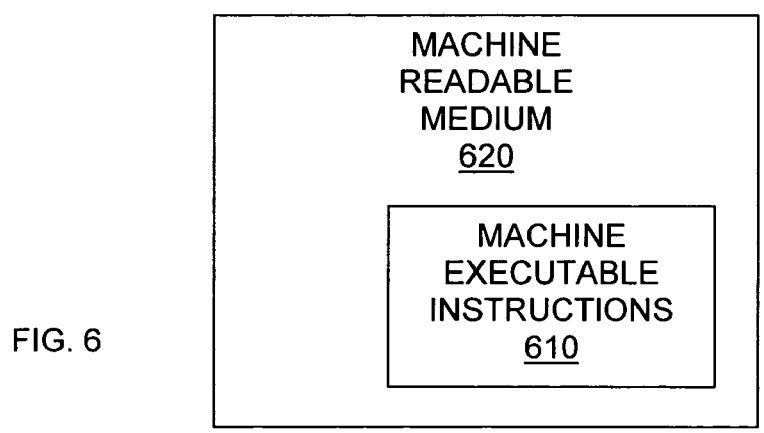
FIG. 6 illustrates one embodiment of a machine-readable medium to store executable instructions for embodiments of the present invention.

Alternately, as shown in FIG. 6, the software routines can be machine executable instructions 610 stored using any machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 550 of FIG. 5.

From whatever source, the instructions may be copied from the storage device into temporary memory 520 and then accessed and executed by processor 510. In one implementation, these software routines are written in the C programming language. It is to be appreciated, however, that these routines may be implemented in any of a wide variety of programming languages.

In alternate embodiments, the present invention as described above may be implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, rights enforcement and usage reporting for content on a client device is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
    obtaining clear form rights information at a client device, said clear form rights information being associated with content stored at said client device;
    generating a validation hash from at least the clear form rights information;
    obtaining, by said client device, an external key comprising an integrity secret, wherein said integrity secret is vulnerable based at least in part on its being known to at least an external server device;
    obtaining a clear form external integrity hash of first data comprising:
        said clear form rights information and
        said external key,
        wherein said clear form external integrity hash is vulnerable based at least in part on said vulnerability of said externally-known integrity secret;
    obtaining an internal integrity hash of second data comprising:
        said clear form rights information,
        said clear form external integrity hash, and
        an externally inaccessible client device key, wherein said externally inaccessible client device key is not accessible outside said client device and said internal integrity hash is not vulnerable based on a relative comparison with said vulnerability of said externally-known integrity secret;
    encrypting said internal integrity hash using said externally inaccessible client device key;
    storing the encrypted internal integrity hash on the client device;
    decrypting the encrypted internal integrity hash to recover the internal integrity hash; and
    comparing the validation hash to the internal integrity hash to detect tampering with the rights information.

2. The method of claim 1 wherein obtaining the clear form external integrity hash comprises:
    receiving the clear form external integrity hash from said external server device.

3. The method of claim 1 wherein obtaining the internal integrity hash comprises:
    generating the internal integrity hash on the client device.

4. The method of claim 1 further comprising storing said clear form external integrity hash on the client device.

5. The method of claim 1 further comprising receiving the external key at the client device.

6. The method of claim 2 wherein said external key comprises a server device key.

7. The method of claim 1 further comprising:
    receiving, at the client device, a content key for the content;
    encrypting the content key using the client device key to generate an encrypted content key; and
    storing the encrypted content key on the client device.

8. The method of claim 1 further comprising:
    disabling the content on the client device if tampering is detected.

9. The method of claim 1 further comprising:
    storing the clear form rights information on the client device.

10. The method of claim 8 further comprising:
    reading the clear form rights information from the client device to the external server device.

11. The method of claim 1 wherein the clear form rights information comprises usage information, the method further comprising:
    tracking usage of the content;
    updating the clear form rights information with changes in usage; and
    for each update of the clear form rights information:
        re-obtaining the internal integrity hash of second data comprising the updated clear form rights information, said clear form external integrity hash, and said externally inaccessible client device key; and
        re-encrypting, and re-storing the internal integrity hash on the client device.

12. The method of claim 1 wherein the internal integrity hash comprises a Hash Message Authentication Code (HMAC).

13. The method of claim 1 wherein the client device key comprises a code embedded in hardware of the client device having no externally accessible data path.

14. The method of claim 1 wherein the client device comprises at least one of an MP3 player, a personal data assistant, and cellular phone.

15. The method of claim 1 further comprising at least one of:
   downloading the clear form rights information from the external server device; and
   installing a storage medium having the clear form rights information stored thereon.

16. The method of claim 1 wherein the clear form rights information grants unlimited play for the content on the client device.

17. The method of claim 3 wherein generating the internal integrity hash comprises generating the internal integrity hash in trusted hardware.

18. A client device comprising:
   a register operative to store a client device key, said register being externally inaccessible from the client device;
   a memory operative to store content and clear form rights information associated with the content, said memory being externally accessible;
   hash circuitry operative to:
      obtain a clear form external integrity hash of first data comprising the clear form rights information and an external key as an integrity secret; an
      obtain an internal integrity hash of second data comprising the clear form rights information, the clear form external integrity hash, and the externally inaccessible client device key; and
      generate a validation hash from at least the clear form rights information; encryption circuitry operative to:
      encrypt the internal integrity hash using the client device key; and
      decrypt the encrypted hash to recover the internal integrity hash;
   said memory being further operative to store the encrypted hash, wherein said integrity secret is vulnerable based at least in part on its being known to at least an external server device, wherein said clear form external integrity hash is vulnerable based at least in part on said vulnerability of said externally-known integrity secret, and wherein said internal integrity hash is not vulnerable based on a relative comparison with said vulnerability of said externally-known integrity secret; and
   a comparator to compare the validation hash to the internal in it hash to detect tampering with the clear form rights information.

19. The client device of claim 18 wherein the hash circuitry is operative to obtain the clear form external integrity hash from said external server device.

20. The client device of claim 18 wherein the hash circuitry is operative to generate the internal integrity hash on the client device.

21. The client device of claim 18, said memory being further operative to store the clear form external integrity hash.

22. The client device of claim 19 wherein the external key comprises a server device key.

23. The client device of claim 18 wherein the encryption circuitry is further operative to encrypt a content key for the content using the client device key; and the memory is further operative to store the encrypted content key on the client device.

24. The client device of claim 18 further comprising:
   a content controller to disable the content on the client device if tampering is detected.

25. The client device of claim 18 wherein the rights information comprises usage information, the client device further comprising:
   tracking circuitry to track usage of the content and update the clear form rights information with changes in usage;
   wherein the hash circuitry and the encryption circuitry are further operative to regenerate, re-encrypt, and re-store the internal integrity hash in the memory for each update of the rights information.

26. The client device of claim 18 wherein the client device comprises at least one of an MP3 player, a personal data assistant, and cellular phone.

27. The client device of claim 18 further comprising at least one of:
   an input port to download the clear form rights information from the external server device; and
   a storage medium port to receive a storage medium having the clear form rights information stored thereon.

28. The client device of claim 27 wherein the memory at least partially comprises the storage medium.

29. A non-transitory machine readable medium having stored thereon machine executable instructions, the execution of which to implement a method comprising:
   receiving clear form rights information at a client device, said rights information being associated with content stored on the client device, said client device having a client device key that is externally inaccessible from the client device;
   generating a validation hash from at least the clear form rights information;
   storing the clear form rights information on the client device;
   obtaining an external key comprising an integrity secret, wherein said integrity secret is vulnerable based at least in part on its being known to at least an external server device;
   obtaining a clear form external integrity hash of first data comprising the clear form rights information and said external key;
   obtaining an internal integrity hash of second data comprising said clear form rights information, said clear form external integrity hash, and an externally inaccessible client device key;
   encrypting the internal integrity hash using the externally inaccessible client device key;
   storing the encrypted internal integrity hash on the client device, wherein said integrity secret is vulnerable based at least in part on its being known to at least an external server device, wherein said clear form external integrity hash is vulnerable based at least in part on said vulnerability of said externally-known integrity secret, and wherein said internal integrity hash is not vulnerable based on a relative comparison with said vulnerability of said externally-known integrity secret; and
   decrypting the encrypted internal integrity hash to recover the internal integrity hash; and
   comparing the validation hash to be internal integrity hash to detect tampering with the clear form rights information.

30. The non-transitory machine readable medium of claim 29 wherein obtaining the integrity hash comprises:
   receiving the clear form external integrity hash from said external server device.

31. The non-transitory machine readable medium of claim 29 wherein obtaining the internal integrity hash comprises:
   generating the internal integrity hash on the client device.

32. The non-transitory machine readable medium of claim 29 further comprising storing said clear form external integrity hash on the client device.

33. The non-transitory machine readable medium of claim 30 wherein said external key comprises a server device key.

34. The non-transitory machine readable medium of claim 29 wherein the method further comprises:
  receiving, at the client device, a content key for the content;
  encrypting the content key using the client device key to generate an encrypted content key; and
  storing the encrypted content key on the client device.

35. The non-transitory machine readable medium of claim 29 wherein the method further comprises:
  disabling the content on the client device if tampering is detected.

36. The non-transitory machine readable medium of claim 29 wherein the clear form rights information grants unlimited play for the content on the client device.

37. The non-transitory machine readable medium of claim 36 wherein the method further comprises:
  reading the clear form rights information from the client device out to a server device.

38. The non-transitory machine readable medium of claim 29 wherein the clear form rights information comprises usage information, the method further comprising:
  tracking usage of the content;
  updating the clear form rights information with changes in usage; and
  for each update of the clear form rights information:
    re-obtaining the internal integrity hash of second data comprising the updated clear form rights information, said clear form external integrity hash, and said externally inaccessible client device key; and
re-encrypting, and re-storing the internal integrity hash on the client device.

* * * * *